United States Patent [19]
Kushner et al.

[11] Patent Number: 6,020,392
[45] Date of Patent: Feb. 1, 2000

[54] POLYUREA ELASTOMERIC MICROCELLULAR FOAM

[75] Inventors: Sandra Ann Kushner, New Tripoli; John William Miller, Allentown; James Douglas Tobias, Topton, all of Pa.

[73] Assignee: Air Products and Chemicals, Inc., Allentown, Pa.

[21] Appl. No.: 09/148,512

[22] Filed: Sep. 4, 1998

[51] Int. Cl.[7] .............................. C08J 9/04; C08G 18/46; C08G 18/50; C08G 18/60; C08G 18/32

[52] U.S. Cl. ........................... 521/163; 521/130; 521/131

[58] Field of Search ................... 521/130, 131, 521/163, 164, 167, 170

[56] References Cited

U.S. PATENT DOCUMENTS

| | | | |
|---|---|---|---|
| 3,808,250 | 4/1974 | Blahak et al. | 521/163 |
| 3,817,940 | 6/1974 | Blahak et al. | 521/163 |
| 3,929,863 | 12/1975 | Blahak et al. | 560/50 |
| 4,247,677 | 1/1981 | Schmidt et al. | 528/68 |
| 4,328,322 | 5/1982 | Baron et al. | 521/163 |
| 4,504,648 | 3/1985 | Otani et al. | 528/76 |
| 4,537,945 | 8/1985 | Otani et al. | 528/68 |
| 4,732,959 | 3/1988 | Otani et al. | 528/68 |
| 5,219,973 | 6/1993 | Slack et al. | 528/44 |

OTHER PUBLICATIONS

Wirpsza, A., Polyurthanes Chemistry, Technology and Applications, Ellis Horwood Limited, pp. 142, 143, 1993.

*Primary Examiner*—Rabon Sergent
*Attorney, Agent, or Firm*—Michael Leach

[57] ABSTRACT

A method for making a polyurea microcellular elastomeric foam by reacting an organic polyisocyanate with a di-(aminobenzoate) ester of an oligomeric polyol in the presence of a blowing agent and, optionally, urethane catalyst and cell stabilizing agent.

20 Claims, 2 Drawing Sheets

POLYUREA ELASTOMERIC MICROCELLULAR FOAM

FIELD OF THE INVENTION

The invention relates to the preparation of polyurea (PUR) microcellular elastomeric foam using the one-shot method.

BACKGROUND OF THE INVENTION

In the current technology for microcellular and dynamic polyurethane elastomer applications, the elastomer is prepared by the reaction of naphthalene diisocyanate (1,5-NDI) with an adipate ester polyol followed by chain extension with short chain diols, e. g. , 1,4-butanediol. The drawbacks of this elastomer technology are its inherently limited shelf stability and the need for processors to react monomeric isocyanate with a polyol on site. 1,5-NDI melts as high as 127° C. ; therefore the reaction must take place above 130° C. , a temperature which undesirable side reactions can occur promoting product instability. (Wirpsza, Z. , *Polyurethanes Chemistry, Technology, and Applications,* 1993, Ellis Horwood Limited, pp. 143.) The resultant prepolymer must then be extended within 30 minutes. This entire process requires significant capital investment in processing equipment due to the need for precise ratios of components, short shelf-life and the need to heat the materials to lower the viscosity for processing. Additionally, the system reacts very quickly allowing a very short working time, i. e. , pot life of 0. 5–5. 0 min.

Following the completed reaction, complex cure schedules and annealing processes are employed that are dependent upon the geometry of the parts. Annealing is completed by running several cycles at high temperatures (110° C.) followed by room temperature cycling. This curing cycle can become quite rigorous and must be stringently followed in order to avoid shrinkage, undercure, and inferior physical properties. Deviation from this process results in significant final microcellular part inconsistency and an inability to meet the industry's desire for "Zero Defect" production and compromises quality.

In general, the expenses due to components, equipment, limited shelf-stability and processing of the NDI-based system pose serious drawbacks to its use. Health, safety, and environmental issues associated with the use of NDI are also of concern to the processors employing this technology.

In addition to the NDI-based system, other high viscosity isocyanate-terminated prepolymers, such as those based on MDI and polyester polyols, have been evaluated in elastomeric applications where specific dynamic and static physical properties are necessary. These consist of high viscosity isocyanate-terminated prepolymers that may offer a cost advantage over the NDI-based system; however, ease of processing is limited. A major concern with prepolymer-type systems is the loss of isocyanate functionality (loss of total NCO content) upon continued heating which, in turn, causes degradation of the system. Typically, stability of a prepolymer at a typical processing temperature of 85–90° C. can be limited to only a few hours. (Wirpsza, Z. , *Polyurethanes Chemistry, Technology, and Applications,* 1993, Ellis Horwood Limited, pp. 142) This in turn causes a shift in stoichiometry (ratio of isocyanate to —OH and/or —$NH_2$ groups) which requires a ratio adjustment. Without adjustment of the stoichiometry, the physical properties may be adversely affected, again resulting in inferior properties and inconsistent elastomer quality.

U. S. Pat. No. 4, 328, 322 discloses making synthetic polymers by the reaction of a polyisocyanate with substantially an equivalent of an oligomeric aminobenzoic acid ester or amide. Although directed to making cast elastomeric materials, the patent suggests that polymeric foams can be prepared by including any of a variety of blowing agents.

U. S. Pat. No. 4, 504, 648 discloses a polyurethaneurea comprising the polyaddition reaction product of polyisocyanate and a polyether polyol derivative having at least one terminal amino group in which at least one hydroxyl group is substituted by para-amino-benzoic acid ester. Example 7 shows the preparation of a cellular article having a density of 0. 086 $g/cm^3$.

U. S. Pat. No. 4, 537, 945 discloses a poly(urethane) ureamide made by the reaction of a polyether polyol derivative and a polyisocyanate. Cellular products are suggested by incorporating a blowing agent into the reaction mixture, but no examples for making foam are provided.

U. S. Pat. No. 4, 732, 959 discloses a poly(urethane) ureamide made by the reaction of a polyester polyol derivative and a polyisocyanate. Example 8 shows the preparation of a soft foam sheet allegedly having a density of 0. 60 $g/cm^3$.

BRIEF SUMMARY OF THE INVENTION

The present invention is directed to a method for making a polyurea (PUR) microcellular elastomeric foam by the reaction of a polyisocyanate with a polyol derivative in the presence of a blowing agent and, optionally, urethane catalyst and cell stabilizing agent. The inventive method reacts an organic polyisocyanate, especially a carbodiimide-modified 4, 4'-diphenylmethane diisocyanate, with a di-(aminobenzoate) ester of an oligomeric polyol, i. e. , an oligomeric diamine.

Another embodiment of the invention is a one-shot method for making a microcellular elastomeric foam which comprises mixing and reacting the following components, the wt % s based on the total amount of the first five components and the amount of polyisocyanate expressed in terms of an Isocyanate Index (NCO Index):

| | |
|---|---|
| Oligomeric di-(aminobenzoate) ester | 75–98 wt % |
| Water | 0–0.8 wt % |
| Other Blowing Agent | 0–8 wt % |
| Urethane Catalyst | 0–5 wt % |
| Cell Stabilizer | 0–5 wt % |
| Polyisocyanate | 85–105 Isocyanate Index |

Advantages provided by the invention include:

A microcellular foam exhibiting superior physical properties such as tear strength, tensile strengths, % elongation at break at the prescribed densities.

Dynamic mechanical properties such as dynamic stiffness as a function of temperature show enhanced performance over a low to high temperature range and good loss tangent.

The resultant elastomers have a markedly uniform modulus of elasticity curve over a broad temperature range (E') by Dynamic Mechanical Analysis.

The ability to make a microcellular elastomeric foam using the economical current one-shot technology which is typically used in the flexible molded polyurethane industry.

The ability to make microcellular elastomeric foam meeting specific dynamic and vibrational frequency characteristics at varying densities through formulation.

DETAILED DESCRIPTION OF THE INVENTION

Figure 1:
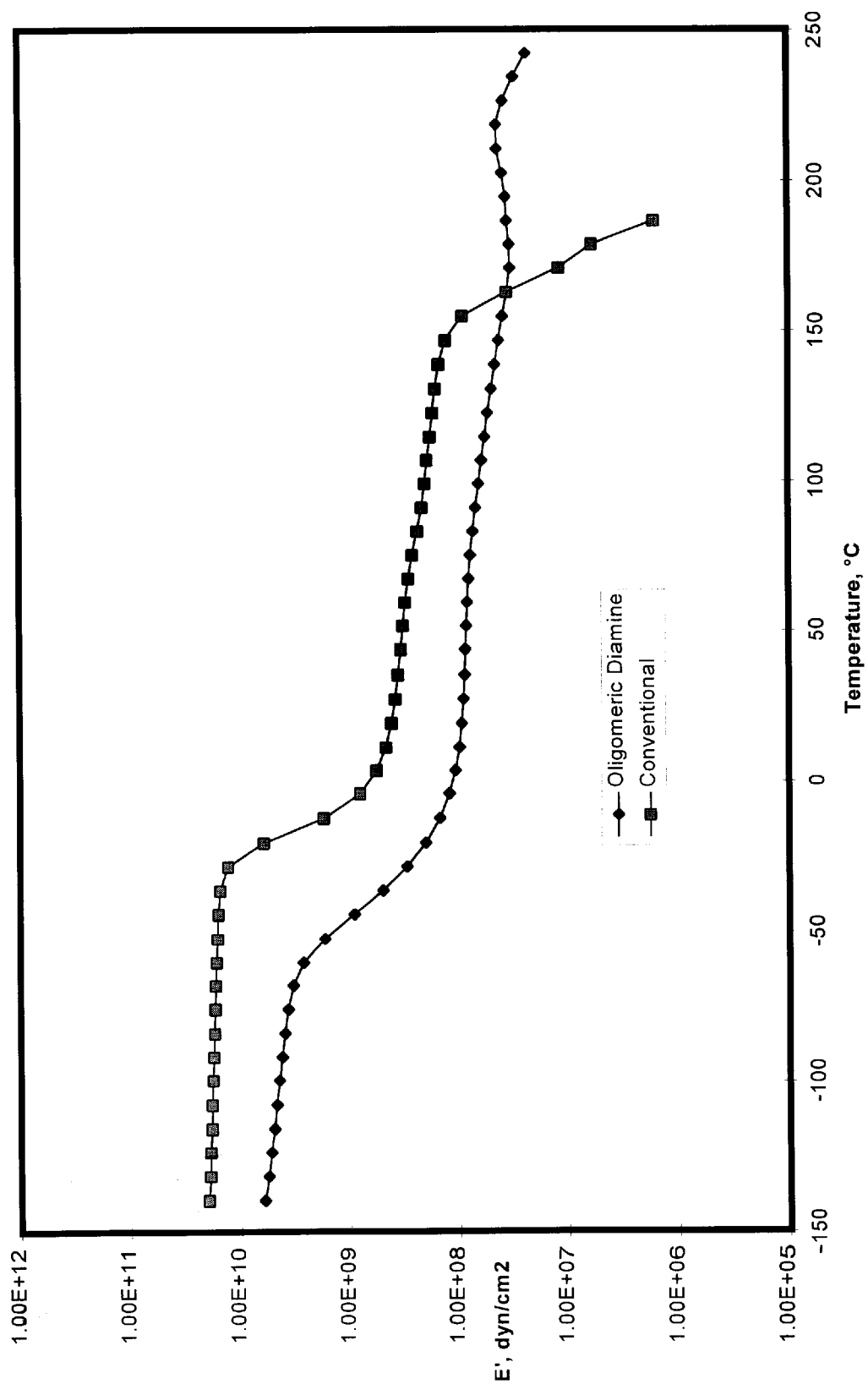
FIG. 1 compares the Storage Modulus (E') of microcellular elastomeric foams prepared from a conventional prepolymer and from an oligomeric diamine according to the invention.

The PUR microcellular elastomeric foam is prepared by reacting a polyisocyanate with an oligomeric diamine in the presence of a blowing agent and optionally, but preferably, urethane catalyst and cell stabilizing agent.

Polyisocyanates useful in the invention are those commonly known to those skilled in the art. Included are aromatic and aliphatic organic compounds that have two or more available isocyanate (NCO) groups. Examples of suitable diisocyanates include toluene diisocyanates (TDI), diphenylmethane diisocyanates (MDI), polymeric MDI or poly(phenylene isocyanates), carbodiimide-modified MDIs and polymeric MDIs, cyclohexane diisocyanates (CHDI), isophorone diisocyanates (IPDI), naphthalene diisocyanates (NDI), 3, 3'-dimethyl-4, 4'-diphenylene diisocyanate (TODI), phenylene diisocyanates including para-phenylene diisocyanate (PPDI) and mixtures thereof. Also suitable but less desirable are isocyanate-terminated PU prepolymer of any of the above polyisocyanate monomers prereacted with a polyether or polyester polyol or other flexible chain containing terminal hydroxyl or amine groups as is well known in the art.

It is preferred to use as the polyisocyanate a carbodiimide-modified diphenyl-methane diisocyanate of higher functionality, i. e. , greater than 2, which is a low acidity, isocyanate intermediate of polymeric MDI with a typical isocyanate equivalent weight range from 125 to 225 (% NCO by weight of 33 to 18).

The oligomeric diamines useful in the invention are those taught in U.S. Pat. Nos. 4, 328, 322 and 5, 410, 009, the disclosures of which are incorporated by reference.

The oligomeric di-(aminobenzoate) esters utilized in the practice of the present invention are aminobenzoate esters of oligomeric polyol materials, especially oligomeric diols, and can be conveniently provided by reaction of a nitro-substituted benzoyl halide, or a nitro-substituted benzoic acid, with a suitable polyol, such as polyalkylene ether or ester polyol, followed by reduction of the nitro groups of the resulting product to the corresponding amino groups. Thus, for example, an oligomeric di-(p-aminobenzoate) ester useful herein can be prepared by reaction by two moles of p-nitrobenzoyl chloride with one mole of a dihydric alcohol such as poly(tetramethylene glycol) having a molecular weight in the range of from about 400 to about 6, 000 and by reduction of the resulting poly(tetramethylene glycol) di-(p-nitrobenzoate) ester. (All molecular weights in this specification and the claims are weight average molecular weights.)

Suitable oligomeric diaminobenzoate esters would have the following structure:

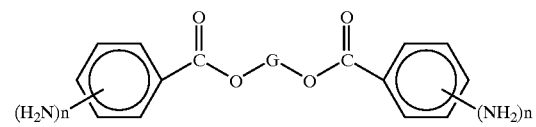

where n is 1 or 2 and G is a divalent radical.

The nature of the radical G of the aminobenzoates can vary and will depend upon the nature of the oligomeric polyol used. The radical G will be derived from a polyol material having a molecular weight of from about 400 to about 6, 000, preferably in the range of about 650 to 2, 000. The radical G can comprise a divalent saturated or unsaturated, straight chain or branch chain hydrocarbon radical which can be interrupted by oxygen ether atoms. For example, where a polyether polyol is used in the preparation of an oligomeric aminobenzoate, the corresponding G radical will comprise repeating oxygen ether atoms. Preferably, radical G will include such oxygen ether atoms.

A preferred class of polyol materials useful in the preparation of the oligomeric aminobenzoate esters comprises the polyalkylene ether glycols which provide a divalent G radical and which may be represented by the formula $HO(RO)_aH$ wherein R is an alkylene radical containing up to 10 carbon atoms and a is an integer sufficient to provide a molecular weight within the range of from about 400 to 6, 000, and preferably from about 650 to 2, 000. Preferably, R is an alkylene radical of from 2 to 4 carbon atoms. Examples of polyalkylene ether glycols useful include polyethylene ether glycol, polypropylene ether glycol, polyhexylene ether glycol, polytetramethylene ether glycol, polydecamethylene ether glycol, poly-1, 2-dimethylethylene ether glycol, and the copolymer of tetrahydrofuran and 1-allyloxy-2, 3-epoxypropane. The polyalkylene ether glycols can be readily obtained, for example, by polymerization of an alkylene ether, e. g. , ethylene oxide, tetrahydrofuran, propylene oxide, or, a mixture thereof, in the presence of water or other low molecular alcohol or hydrogen-donor compound.

Preferred are the p-aminobenzoates and especially preferred are those esters of polyether polyols having molecular weights from 650 to 2000, particularly polytetramethylene ether glycols.

Suitable oligomeric di-(aminobenzoates) useful in making the microcellular elastomeric foams are commercially available and are marketed under the VERSALINK trademark by Air Products and Chemicals, Inc.

In like manner, oligomeric aminobenzamides can be provided using a suitable oligomeric polyamine in place of the polyol. In addition, oligomeric compounds having both hydroxyl and amino groups can be utilized for the preparation of mixed aminobenzoate/amide compounds. Thus, these oligomeric di-(aminobenzamides) and oligomeric di(aminobenzoate/amides) are contemplated as functional equivalents of the oligomeric di-(aminobenzoates) for purposes of this invention. They all are oligomeric diamines.

Obviously to make a cellular, or foam, product the polyisocyanates are reacted in the presence of a blowing agent such as water, CFCs, HCFCs, HFCs, pentane and the like and mixtures of these agents. Water may be used at 0.05 to 0.8 wt %, preferably 0.1 to 0.3 wt % of the B-side composition. The water for the reaction with the isocyanate to generate carbon dioxide may be present in the oligomeric diamine composition as a result of its preparation or in the catalyst composition, or may simply be added in the appropriate amount, or both. Physical blowing agents such as the CFCs, HCFCs, HFCs, and pentane may be used at 0.5 to 8 wt %, preferably 1 to 3 wt % of the B-side composition.

Other typical materials which may be used in the PUR microcellular elastomeric foam formulations include urethane catalysts such as the tertiary amines and metal-based catalysts well known in the urethane art for the gelling and blowing reactions; other polyamine curatives such as MOCA, polyols and short chain diols, cell stabilizers such as silicones and polysiloxane polyether glycols, antioxidants antifungal agents and antihydrolysis agents.

The polyisocyanate is reacted with the di-(aminobenzoate) ester at an equivalents ratio of 0.85 to 1.1 eq NCO per diamine eq, in the presence of a blowing agent to yield a high molecular weight, microcellular PUR elastomer foam. The components can be mixed in a polyurethane dispensing machine as is typically done in the one-shot polyurethane foam art, e.g., the diamine (B-side component) and the polyisocyanate (A-side component) are mixed together, and charge into a heated mold. No prereaction as is done in the prepolymer method is necessary. The reaction temperature of the mold will commonly be within the range of about ambient to about 70° C.; a more preferred range being from about 60° C. to about 66° C.

A one-shot process involves mixing and reacting an A-side comprised of the polyisocyanate with a B-side comprising the remaining components of the formulation, e.g., in the following formulation the oligomeric diamine, blowing agent, urethane catalyst(s) and cell stabilizing surfactant would compose the B-side. The A-side and B-side are mixed at room temperature or elevated temperature and dispensed into molds.

| COMPONENT | BROAD | PREFERRED |
|---|---|---|
| B-Side | | |
| Di-(aminobenzoate) ester | 75–98 wt % | 75–85 wt % |
| Water | 0–0.8 wt % | 0.1–0.3 wt % |
| Blowing Agent | 0–8 wt % | 1–3 wt % |
| Urethane Catalyst | 0–5 wt % | 0.5–2 wt % |
| Cell Stabilizer | 0–5 wt % | 0–1 wt % |
| A-Side | | |
| Isocyanate, preferably modified MDI | 85–105 NCO Index | |

The amount of the B-side components are expressed in wt % of the total B-side while the amount of polyisocyanate is expressed in equivalents % of active hydrogen equivalents of the B-side components.

Advantageous to the performance of this system is the balanced reaction rate gained by employment of the specific catalyst levels. The rate of reaction yielded solely by use of the oligomeric diamine/polyisocyanate combination is enhanced by the combination of tertiary amines. Thus the entire heat of reaction of this process takes place within the mold contributing to the overall rise in temperature and resultant rapid production of finished microcellular parts.

The microcellular PUR elastomeric foams prepared using the described oligomeric diamines method have a density of 20–65 lb/ft$^3$ (320–1041 kg/m$^3$), preferably 40–55 lb/ft$^3$ (640–881 kg/m$^3$), and usually closed cells 70–200 $\mu$m in diameter and of roughly uniform size. The properties of such elastomeric foams as measured by Dynamic Mechanical Analysis (DMA) indicate lower heat build up under dynamic load which may imply longer service life. In addition, use of the oligomeric diamines provides retention of storage modulus over a broad temperature range, particularly a range experienced by weather or seasonal changes.

In the examples, the following materials were used:

Versalink® P-1000—poly(tetramethylene oxide)-di-p-aminobenzoate from Air Products and Chemicals, Inc. (80–85 mole% di-aminobenzoate and 15–20 mole% mono-aminobenzoate; Amine Eq Wt=640–690 g/mole eq and Total Eq Wt=575–625 g/mole eq)

Dabco 33-LV® —33 wt % triethylenediamine in dipropylene glycol from Air Products and Chemicals, Inc.

Dabco® BL-11—70 wt % bis(dimethylaminoethyl) ether in dipropylene glycol from Air Products and Chemicals, Inc.

Isonate® 2143L—modified MDI from Dow Chemical.

QE 130—quasi-prepolymer based on poly(tetramethylene glycol) and MDI from Air Products and Chemicals, Inc.

Rubinate® M—polymeric MDI from ICI Americas.

EXAMPLES 1–7

General Microcellular Foam Procedure

In the following examples the B-side components were blended with the A-side isocyanate-terminated prepolymer in the amounts (grams) shown in Table 1. A more than sufficient amount of the blend to fill the mold was charged into a mold that was 0.25 inch (0.635 cm) thick having a volume of 0.0072 ft$^3$ (204 cm$^3$) and heated to 150° F. (66° C.). The reaction was complete and the part demolded in four minutes.

TABLE 1

| EXAMPLES | 1 | 2[a] | 3 | 4 | 5 | 6 | 7 |
|---|---|---|---|---|---|---|---|
| B-Side | | | | | | | |
| Versalink P-1000 | 210 | 94 | 210 | 210 | 210 | 210 | 210 |
| Dabco 33-LV | 0.5 | 0.5 | 0.5 | 0.5 | 0.5 | 0.5 | 0.5 |
| Dabco BL-11 | 0.5 | 0.5 | 0.5 | 0.5 | 0.5 | 0.5 | 0.5 |
| Water | 0.2 | 0.2 | 0.0 | 0.4 | 0.6 | | 0.2 |
| HCFC-141b | | | | | | 10 | |
| A-Side | | | | | | | |
| Isonate 2143L | 50 | — | 50 | 50 | 50 | 50 | — |
| QE 130 | — | 50 | — | — | — | — | — |
| Rubinate M | — | — | — | — | — | — | 54 |
| Foam Physical Properties | | | | | | | |
| Average Tensile (psi; MPa) | 1101; 7.7 | 70; 0.6 | 1226; 8.6 | 237; 1.7 | 258; 1.9 | 1071; 7.5 | — |
| Average Elongation (%) | 410 | 19 | 470 | 726 | 212 | 449 | — |
| Hardness Shore A | 65 | 40 | 82 | 59 | 52 | 82 | 32 |
| Density (pcf; kg/m$^3$) | 48; 769 | 33; 529 | 55; 881 | 34; 545 | 29; 465 | 55; 881 | 54; 868 |

[a] Foam difficult to de-mold, undercured, unacceptable

The data in Table 1 shows tensile strengths can be acceptably maintained over a range of densities while also maintaining the Shore A hardness necessary for part integrity and performance. Although the Example 2 foam was unacceptable possibly 15 due to the quasi-prepolymer being heat sensitive, reformulation using a different oligomeric diamine and/or polyisocyanate may afford an acceptable foam.

Using Dynamic Mechanical Analysis, data was collected on samples of the microcellular foam of Example 1 (Table 1). DMA measures the ability of a viscoelastic material to store and dissipate mechanical energy. (See Clift, S. M., "Understanding the Dynamic Properties of Polyurethane Cast Elastomers", SPI 33rd Annual Technical/Marketing Conference, 1990.) The measurements are based on applying a small sinusoidal strain and measuring the difference in response of the viscous and elastic components. The resultant stress measurements were collected in tensile mode at a frequency of 1 Hertz over a temperature range of −150° C. to 250° C.

FIG. 1 exemplifies the typical DMA of the microcellular elastomer of Example 1 versus a prepolymer based on an MDI-polyester prepolymer typically used in the industry. The spectra indicate the retention of storage modulus E' over a broad temperature range (similar to a range of exposure experienced through weather or seasonal changes; −25° C. to >150° C.). The advantage is little or no change in product properties over this broad temperature range as well as less temperature dependent stiffness. In addition, higher hard segment melting point is observed with the oligomeric diamine system. This again supports the utility of the material in applications where exposure to high heat is an issue.

Figure 2:
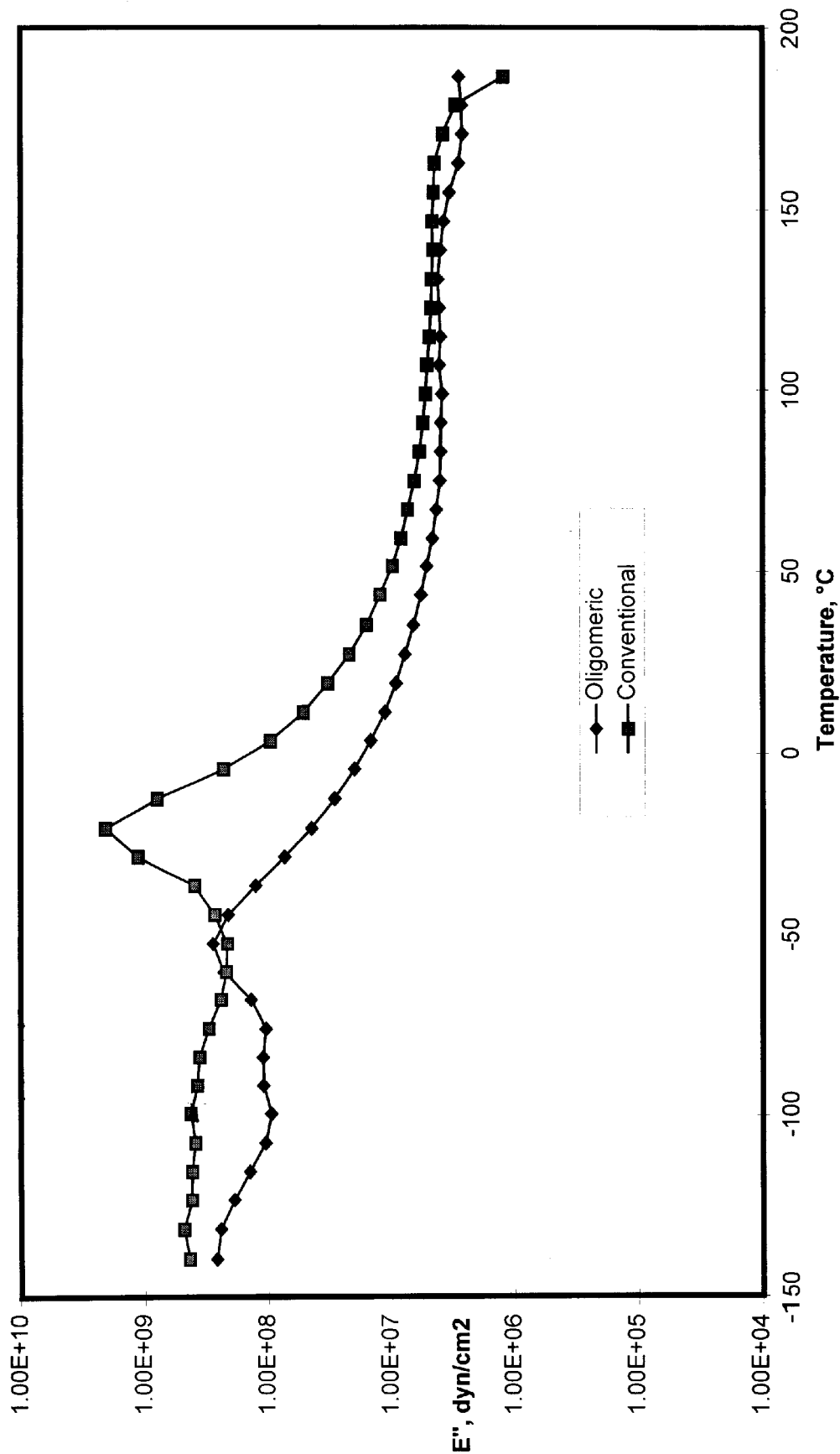
FIG. 2 compares the Loss Modulus (E") of microcellular elastomeric foams prepared from a conventional prepolymer and from an oligomeric diamine according to the invention.

FIG. 2 demonstrates using loss compliance as a function of temperature to gauge the hysteretic energy loss. (Loss compliance is defined as a measure of the energy lost as heat per cycle at a given stress amplitude.) The oligomeric diamine-based system yielded successively lower loss compliance. Advantages derived from this would be indicative of less heat generation during use.

STATEMENT OF INDUSTRIAL APPLICATION

The invention provides for the production of microcellular polyurethane/urea elastomeric foam which can be used for jounce bumpers in the undercarriage spring assemblies for cars, chassis mounts and other applications which require good vibrational dampening characteristics as well as low temperature resistance and flexibility, high temperature resistance, suitable mechanical properties (i. e., tensile strength), and ease of processing.

We claim:

1. A method for making a microcellular foam by reacting an organic polyisocyanate with a diamine in the presence of a blowing agent and, optionally, urethane catalyst and a cell stabilizing agent, which comprises making a polyurea microcellular elastomeric foam having a density of 20–65 lb/ft$^3$ (320–1041 kg/M$^3$) by reacting the polyisocyanate with an oligomeric diamine which is a di-(para-aminobenzoate) of an oligomeric diol, a di-(aminobenzamide) of an oligomeric diamine or a di-(aminobenzoate/amide) of an oligomeric compound having both a hydroxyl group and an amino group.

2. The method of claim 1 in which the polyisocyanate is selected from the group consisting of toluene diisocyanates (TDI), diphenylmethane diisocyanates (MDI), polymeric MDI, poly(phenylene isocyanates), carbodiimide-modified MDIs, carbodiimide-modified polymeric MDIs, cyclohexane diisocyanates (CHDI), isophorone diisocyanates (IPDI), naphthalene diisocyanates (NDI), 3, 3'-dimethyl-4, 4'-diphenylene diisocyanate (TODI), phenylene diisocyanates, para-phenylene diisocyanate (PPDI) and mixtures thereof.

3. The method of claim 1 in which the blowing agent comprises water.

4. The method of claim 3 in which the blowing agent also comprises a CFC, HCFC, HFC or pentane.

5. The method of claim 1 in which the polyisocyanate is reacted with di-(para-animobenzoate) having the following structure:

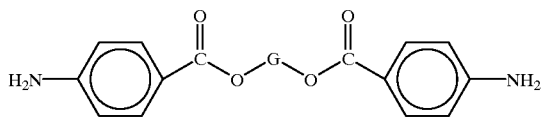

where G is a divalent radical derived from an oligometic diol having a molecular weight of from about 400 to about 6,000.

6. The method of claim 5 in which G is a divalent saturated or unsaturated, straight chain or branch chain hydrocarbon radical which optionally is interrupted by oxygen ether atoms.

7. The method of claim 5 in which the oligomeric diol is represented by the formula $HO(RO)_aH$ wherein R is an alkylene radical containing up to 10 carbon atoms and a is an integer sufficient to provide a molecular weight within the range of from about 400 to 6,000.

8. The method of claim 7 in which the oligomeric diol is a poly(ethylene oxide) glycol, a poly(propylene oxide) glycol, a poly(tetramethylene oxide) glycol, a poly(propylene oxide)-co-poly(ethylene oxide) glycol, a poly(propylene oxide) tipped with poly(ethylene oxide), or mixtures thereof.

9. The method of claim 5 in which the oligomeric diol is a poly(tetramethylene oxide) glycol.

10. A method for making a polyurea microcellular elastomeric foam having a density of 20–65 lb/ft$^3$ (320–1041 kg/m$^3$) which comprises reacting in a one-shot process an A-side comprising an organic polyisocyanate with a B-side comprising a poly(alkylene glycol ether)-di-(para-aminobenzoate), a blowing agent and, optionally, urethane catalyst and a cell stabilizing agent, the polyisocyanate being reacted with the di-(para-aminobenzoate) at an equivalents ratio of 0.85 to 1.1 polyisocyanate per diamine and the blowing agent comprising water at 0.05 to 0.8 wt % of the B-side.

11. The method of claim 10 in which the polyisocyanate is selected from the group consisting of diphenylmethane diisocyanates (MDI), polymeric MDI, poly(phenylene isocyanates), carbodiimide-modified MDIs, carbodiimide-modified polymeric MDIs, and mixtures thereof.

12. The method of claim 11 in which the poly(alkylene glycol ether)-di-(p-aminobenzoate) is a poly(tetramethylene oxide)-di-(p-aminobenzoate) having a molecular weight in the range of 650 to 2000.

13. The method of claim 12 in which the poly(tetramethylene oxide) moiety has a molecular weight of about 1000.

14. The method of claim 11 in which the polyisocyanate is a carbodiimide-modified diphenylmethane diisocyanate of functionality greater than 2.

15. The method of claim 14 in which an HCFC, CFC, HFC or pentane is also used as a blowing agent.

16. The method of claim 10 in which the polyurea microcellular elastomeric foam has a density of 640 to 881 kg/m$^3$.

17. The method of claim 16 in which the poly(alkylene glycol ether)-di-(p-aminobenzoate) is a poly(tetramethylene oxide)-di-(p-aminobenzoate) having a molecular weight in the range of 650 to 2000.

18. The method of claim 17 in which the poly(tetramethylene oxide) moiety has a molecular weight of about 1000.

19. The method of claim 17 in which the polyisocyanate is a carbodiimide-modified diphenylmethane diisocyanate of functionality greater than 2.

20. The method of claim 19 in which an HCFC, CFC, HFC or pentane is also used as a blowing agent.

* * * * *